United States Patent
Nyström et al.

(10) Patent No.: US 9,935,749 B2
(45) Date of Patent: *Apr. 3, 2018

(54) METHOD AND APPARATUS FOR ALLOCATING A PILOT SIGNAL ADAPTED TO THE CHANNEL CHARACTERISTICS

(71) Applicant: Telefonaktiebolaget L M Ericsson (publ), Stockholm (SE)

(72) Inventors: Johan Nyström, Stockholm (SE); Pàl Frenger, Linköping (SE); Erik Dahlman, Bromma (SE); Svante Signell, Vällingby (SE); Göran Klang, Enskede (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 342 days.

This patent is subject to a terminal disclaimer.

(21) Appl. No.: 14/465,418

(22) Filed: Aug. 21, 2014

(65) Prior Publication Data

US 2014/0362805 A1    Dec. 11, 2014

Related U.S. Application Data

(63) Continuation of application No. 12/926,511, filed on Nov. 23, 2010, now Pat. No. 8,843,144, which is a
(Continued)

(30) Foreign Application Priority Data

Dec. 12, 2003   (EP) .................................... 03104661

(51) Int. Cl.
*H04L 5/00*   (2006.01)
*H04L 25/02*  (2006.01)
(Continued)

(52) U.S. Cl.
CPC ............ *H04L 5/0048* (2013.01); *H04L 5/006* (2013.01); *H04L 25/0226* (2013.01);
(Continued)

(58) Field of Classification Search
CPC ...................................................... H04L 5/0048
See application file for complete search history.

(56) References Cited

U.S. PATENT DOCUMENTS

| 5,867,478 A | 2/1999 | Baum et al. |
| 5,867,528 A | 2/1999 | Verbueken |

(Continued)

FOREIGN PATENT DOCUMENTS

| EP | 0 862 343 A2 | 9/1998 |
| JP | H11150521 A | 6/1999 |

(Continued)

OTHER PUBLICATIONS

English translation of the Taiwanese Office Action dated Jul. 13, 2011 in TW application 093134921.
(Continued)

*Primary Examiner* — Hassan Kizou
*Assistant Examiner* — Deepa Belur
(74) *Attorney, Agent, or Firm* — Baker Botts, LLP

(57) ABSTRACT

A set of different pilot structures are designed for use in different environments and/or different user behaviors that are expected to occur in a cell. The radio conditions for a user are estimated. Each user is then assigned an area (108A-E) in resource space for its communication, which has a suitable pilot configuration. In one embodiment, the entire resource space is provided with different pilot structures in different parts (110A-D) In advance and allocation of resources to the users are then performed in order to match estimated radio conditions to the provided pilot structure. In another embodiment, allocation is performed
(Continued)

first, and then the actual pilot structure is adapted within the allocated resource space area to suit the environmental conditions.

35 Claims, 10 Drawing Sheets

Related U.S. Application Data continuation of application No. 10/582,478, filed as application No. PCT/EP2004/053192 on Dec. 1, 2004, now Pat. No. 7,904,093.

(51) Int. Cl.
| | |
|---|---|
| *H04W 16/02* | (2009.01) |
| *H04W 16/12* | (2009.01) |
| *H04W 72/08* | (2009.01) |
| *H04L 1/00* | (2006.01) |
| *H04W 16/10* | (2009.01) |
| *H04W 52/32* | (2009.01) |

(52) U.S. Cl.
CPC ............ *H04W 16/02* (2013.01); *H04W 16/12* (2013.01); *H04L 1/0026* (2013.01); *H04L 5/0007* (2013.01); *H04W 16/10* (2013.01); *H04W 52/325* (2013.01); *H04W 72/08* (2013.01)

(56) References Cited

U.S. PATENT DOCUMENTS

| | | | |
|---|---|---|---|
| 5,887,476 A | 3/1999 | Baum et al. | |
| 5,887,528 A | 3/1999 | Verbueken | |
| 5,956,642 A | 9/1999 | Larsson et al. | |
| 6,430,200 B1* | 8/2002 | Han | H04W 48/10 370/331 |
| 6,452,936 B1 | 9/2002 | Shiino | |
| 6,868,056 B1 | 3/2005 | Sudo | |
| 7,164,669 B2 | 1/2007 | Li et al. | |
| 7,248,559 B2 | 7/2007 | Ma et al. | |
| 7,283,559 B2 | 10/2007 | Cho et al. | |
| 7,286,519 B2 | 10/2007 | Eppinger et al. | |
| 7,515,875 B2 | 4/2009 | Horisaki | |
| 7,532,675 B2 | 5/2009 | Li et al. | |
| 7,643,578 B2 | 1/2010 | Hoo et al. | |
| 7,773,690 B2 | 8/2010 | Hoo et al. | |
| 7,796,695 B2 | 9/2010 | Lee et al. | |
| 8,085,875 B2 | 12/2011 | Gore et al. | |
| 8,238,456 B2 | 8/2012 | Li et al. | |
| 8,396,141 B2 | 3/2013 | Lindoff et al. | |
| 8,526,514 B2 | 9/2013 | Kim et al. | |
| 2002/0127982 A1 | 9/2002 | Haapoja et al. | |
| 2003/0072395 A1 | 4/2003 | Jia et al. | |
| 2003/0123559 A1 | 7/2003 | Classon et al. | |
| 2003/0179776 A1* | 9/2003 | Sumasu | H04L 5/0048 370/491 |
| 2003/0215021 A1* | 11/2003 | Simmonds | H04L 5/0048 375/260 |
| 2006/0146867 A1* | 7/2006 | Lee | H04L 1/0618 370/465 |

FOREIGN PATENT DOCUMENTS

| | | |
|---|---|---|
| JP | 2000-151548 A | 5/2000 |
| JP | 2003-110517 A | 4/2003 |
| JP | 2004-529527 A | 9/2004 |
| WO | 03/007593 A1 | 9/2003 |
| WO | 03/077492 A1 | 9/2003 |
| WO | 2003/079593 A1 | 9/2003 |

OTHER PUBLICATIONS

Kishiyama et al, "Investigation of optimum pilot channel structure for VSF-OFDM broadband wireless accessing forward line", IEEE Vehicular Technology Conference, pp. 139-144, Apr. 22-25, 2003.
R1-030679, 3GPP TSG-RAN-1 Meeting #33, "Different Pilots Shape Distribution for OFDM Blocks", WAVECOM, New York, USA, Aug. 25-29, 2003.
International Search Report of PCT/EP2004/053192, dated Mar. 4, 2005.
Indian Office Action dated Nov. 12, 2008 in corresponding Indian application 4001/DELNP/2006.
English translation of Chinese Office Action dated Dec. 5, 2008 in corresponding Chinese application 200480036593.1.
English translation of the JP Office Action dated Sep. 3, 2010 in corresponding JP application No. 2006-543533.
Indian Office Action dated Nov. 12, 2008 in corresponding Indian application No. 4001/DELNP/2006.

* cited by examiner

METHOD AND APPARATUS FOR ALLOCATING A PILOT SIGNAL ADAPTED TO THE CHANNEL CHARACTERISTICS

This application is a continuation of U.S. patent application Ser. No. 12/926,511, filed Nov. 23, 2010, pending, which is a continuation of U.S. patent application Ser. No. 10/582,478 filed Jun. 12, 2006, granted as U.S. Pat. No. 7,904,093, issued Mar. 8, 2011, which is the US national phase of international application PCT/EP2004/053192, filed 1 Dec. 2004, which designated the U.S. and claims priority of EP 03104661.8, filed 12 Dec. 2003, the entire contents of each of which are hereby incorporated by reference.

TECHNICAL FIELD

The present invention relates generally to wireless multi-carrier communications systems and in particular to resource allocation and pilot signals of such systems.

BACKGROUND

In most wireless systems, e.g. GSM (Global System for Mobile communications), WCDMA (Wideband Code Division Multiple Access), WLAN (Wireless Local Area Network), special well known training sequences or pilot signals are transmitted so that the receiver can estimate the channel parameters sufficiently well for detection of any data signal, not previously known by the receiver. Several methods exist to do this, some use user specific pilots and some use common pilots or combinations. Some pilots are code spread and overlaid with user data, others have dedicated time-frequency slots when pilots are transmitted. In any case, some part of the available radio resources must be allocated for pilots resulting in overhead that cannot be used for data.

In single-carrier systems, such as e.g. described in U.S. Pat. No. 6,452,936, pilot data can be provided in certain time slots within a transmission frame. A shorter time interval between successive pilot data gives a more accurate channel estimation, but decreases instead the transmission rate. In U.S. Pat. No. 6,452,936, a particular code of the CDMA system is allocated to a user. A pilot density of a frame structure is continuously selected dependent on channel estimation information.

A multi-carrier approach has been proposed in wireless communications systems, in which a data stream typically is separated into a series of parallel data streams, each of which is modulated and simultaneously transmitted with a different frequency. An example of a multi-carrier system is an OFDM (Orthogonal Frequency Division Multiplexing) system. This allows a relative size of transmitted symbols relative to a multipath delay to be much larger which reduces intersymbol interference. Such a cellular multi-user, multi-carrier wireless communications system thus allows a particular user to utilise more than one carrier simultaneously. The allocation of one or several carriers depends typically on quality of service consideration, such as requested transmission rate. Generally, in a multi-carrier, multi-user system, the resource space is used in a flexible manner to give each user the best possible quality at each time. The principles and requirements for providing channel estimations become in this way more complex than in a single-carrier system, since a continuously use of a single communication resource is not ensured. In a cellular multi-user, multi-carrier wireless communications system, the base station must accommodate many users that each experiences different channel characteristics due to fading in both time and frequency. Furthermore, different users travel at different speeds and thus experience different Doppler shifts.

Today, there are a few multi-carrier systems in use. However, they are not particularly designed for the difficult, ever changing, hard-to-predict multi-user environments that are envisioned for future wireless systems.

For example, the systems for DVB/DAB (Digital Video Broadcasting/Digital Audio Broadcasting) are broadcast systems that cannot take into account the need for individual users. Such systems must design their pilot structure according to the worst-case scenario so that detection becomes possible even under the worst possible conditions. Such a pilot structure gives rise to a substantial pilot overhead, and is indeed necessary in these worst-case scenarios. However, whenever the situation is better than the worst case, which typically is the case most of the time, the pilot structure is unnecessarily extensive, giving an unnecessary pilot overhead for most users. The pilot overhead can indeed be substantial. This reduces data capacity in the own cell and furthermore increases the interference to the neighbouring cells (so called 'pilot pollution').

Another example of a multi-carrier system is WLAN (i.e. IEEE 802.11a, IEEE 802.11g). Such a system is designed for a limited geographical area in which the users are stationary or slowly moving. The design is not intended for conditions in which the user is moving quickly or for handling mobility in a multi-cellular environment.

In the published US patent application 2003/0215021, a communications system is disclosed, in which channel characteristics are determined by analysing a signal received over a (sub)-carrier. The determined characteristics are then used to divide the sub-carriers into groups of similar fading characteristics. Each group is then allocated a pilot sub-carrier. The determined pilot allocation scheme is then used for future transmissions across the sub-carrier. This system compensates for differences in fading characteristics over the carrier bandwidth, but has a disadvantage in that it is assumed that a sub-carrier is continuously used for one single user. A user has to have access to a large number of sub-carriers in order to make such a pilot allocation efficient. Furthermore, entire sub-carriers are allocated as pilot sub-carriers, which occupies a large part of the available resource space, contributing to the pilot pollution.

SUMMARY

The main problems with existing solutions are that pilot structures are either not at all suitable for considerably changing radio conditions or that they are designed for worst cases which in turn results in vast pilot overhead and "pilot pollution"

An objective of the technology disclosed herein is to provide methods and devices for multi-user multi-carrier wireless communications system, which are capable to provide all users with sufficient pilots without causing unnecessary pilot overhead and pilot pollution. A further objective of the technology disclosed herein is to provide such methods and devices, which are easy to implement within present and planned wireless systems.

The above objectives are achieved by, e.g., methods and devices wherein a set of different pilot structures are designed for use in different environments and/or different general radio characteristics that are expected to occur in the cell. The radio conditions for a user are estimated, either from direct measurements or from knowledge about the cell characteristics, possibly combined with position information. Each user is then assigned an area in resource space for its communication, which has a suitable pilot configuration. In one embodiment, the entire resource space is provided with different pilot structures in different parts in advance and allocation of resources to the users are then performed in order to match estimated radio conditions to the provided pilot structure. In another embodiment, allocation is performed first, and then the actual pilot structure is adapted within the allocated resource space area to suit the environmental conditions. For best performance, depending on such things as frequency selectivity, time selectivity (e.g. time dispersion and Doppler shift), and path loss the amount of pilot energy should be adapted and the 'distance' between pilots in the time-frequency domain needs to be changed.

The radio resource space can have different dimensions. In multi-carrier systems, frequency is one dimension. Other dimensions that could be utilised within the present invention are time, code, antenna and/or spatial dimensions. One or several of these dimensions span the radio resource space, in which the present invention is applied.

By adapting the pilot structure to the environment or set of environments likely to occur in the cell and allocating these pilots to the users most likely to benefit from them, an overall efficiency is achieved. The amount of pilot overhead is then connected to the actual environments being accommodated. Difficult environments require more overhead than simpler ones and hence pilot pollution is reduced on the average.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following description, OFDM (Orthogonal Frequency Division Multiplexing) systems are used for exemplifying the technology disclosed herein. However, the technology disclosed herein can also be applied to other multi-carrier wireless communications systems.

In the present disclosure, "pilots" refer to signals known by a receiver and therefore used for estimation purposes. "Data" refers to signals not previously known by the receiver, typically user data, control signals or broadcast information.

Figure 1:
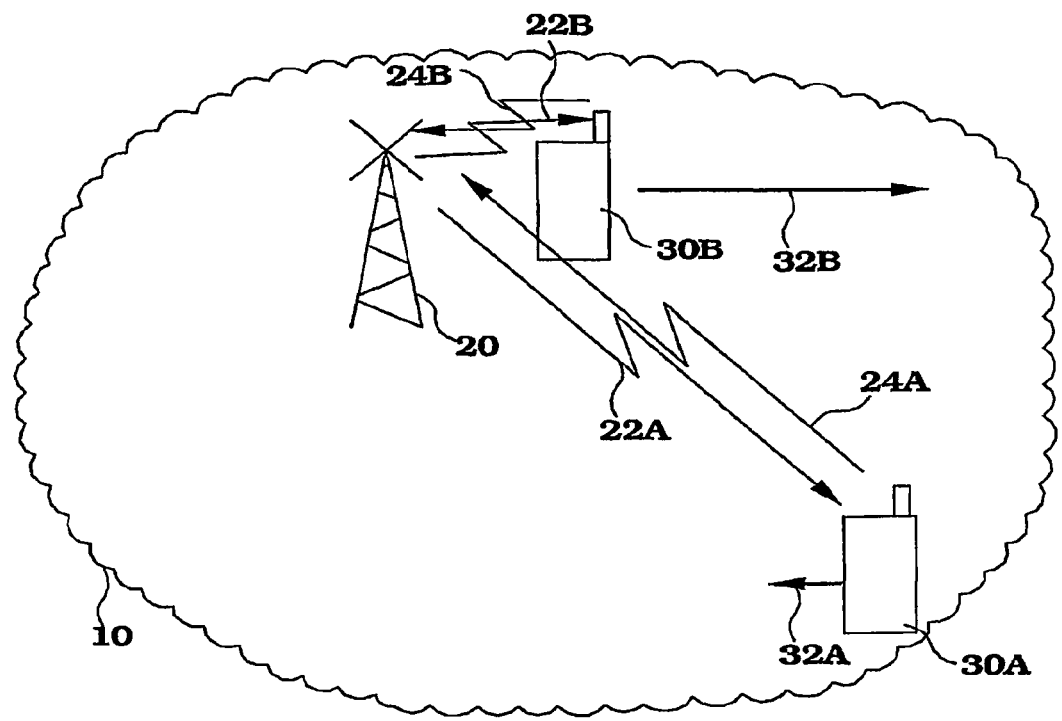
FIG. 1 is a schematic illustration of a multi-user wireless communication system.

FIG. 1 illustrates a multi-user multi-carrier wireless communications system 10, in this particular embodiment intended to be an OFDM system. Non-exclusive examples of other communications systems, in which the technology disclosed herein is advantageously applicable, are IFDMA (Interleaved Frequency Division Multiple Access) systems, non-orthogonal or bi-orthogonal multi-carrier systems. A base station or access point 20 communicates with two mobile stations or user equipments 30A, 30B. There is a downlink connection 22A between the access point 20 and the user equipment 30A and an uplink connection 24A between the same nodes. Likewise, there is a downlink connection 22B between the access point 20 and the user equipment 30B and an uplink connection 24B between the same nodes. User equipment 30A is located at a relatively large distance from the access point 20, but the speed 32A (illustrated as an arrow) of the user equipment 30A is small. User equipment 30b is located closer to the access point 20, but has a high speed 32B (also illustrated as an arrow). The user equipment 30A may have a relatively high need for repetitive pilots in the frequency dimension, since the propagation conditions for the different carriers may differ considerably over the bandwidth in case of multi-path propagation with large delay spread. However, the radio conditions are probably quite slowly varying with time due to the small speed of user equipment 30A. The user equipment 30B is close to the access point, and a pilot on one frequency can probably be used for channel estimations for many neighbouring carriers. However, the radio conditions are probably changing rapidly in time, whereby frequent pilots in time dimension are required.

Figure 2A:
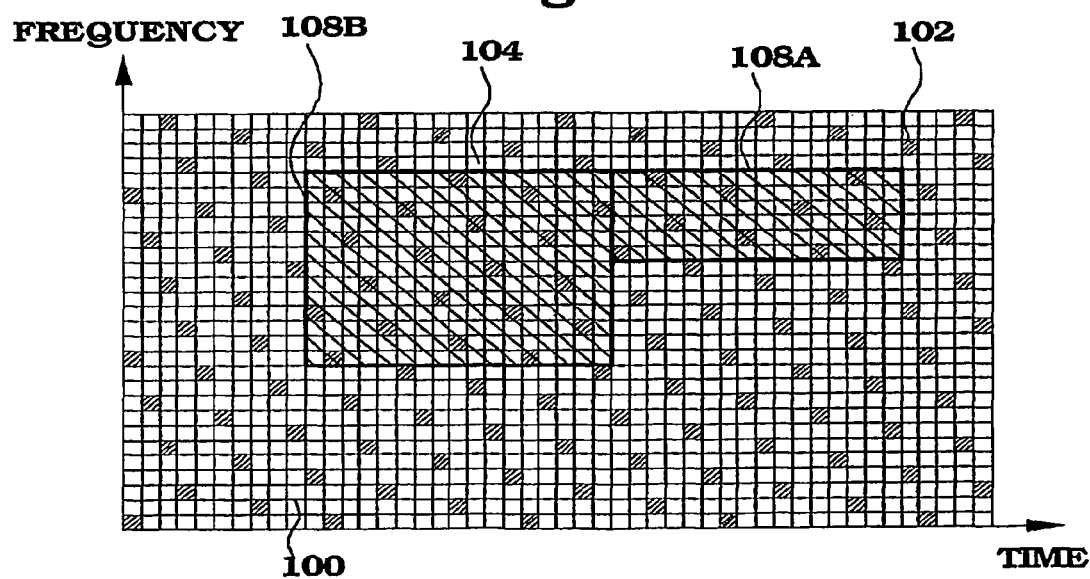
FIGS. 2A and 2B are illustrations of pilot structures in time-frequency space, and the allocation of different users to subspaces.

FIG. 2A is a diagram of a time-frequency space. This can represent a limited portion of the entire available radio resource space 100 in these two dimensions. Data is transmitted in quantities limited in time and frequency. These data quantities correspond to the small squares 104 in the diagram. Selected ones 102 of these data quantities contain pilot data and are illustrated in the diagram with hatching. The pilot structure is in this embodiment dispersed over the time-frequency space relatively uniformly. With this distribution, one data quantity out of 11 is occupied by pilot data. The useful data transmission rate is thereby reduced by $1/11$. The users of the user equipments 30A and 30B (FIG. 1) have allocated radio resources within the available radio resource space 100. User equipment 30A is allocated the resource sub-space indicated by 108A, while user equipment 30B is allocated the resource sub-space indicated by 108B. Both users are experiencing the same pilot density and the uniform distribution between the frequency and time dimensions.

User 30B moves fast. The time between two consecutive pilot messages in time dimension is 11 time slots, and even if information from neighbouring frequencies are used for channel estimation in the meantime, at least 4 time slots will pass between two consecutive updates. The speed of user 30B is so high that this pilot structure is not sufficient for an acceptable quality of service.

Figure 2B:
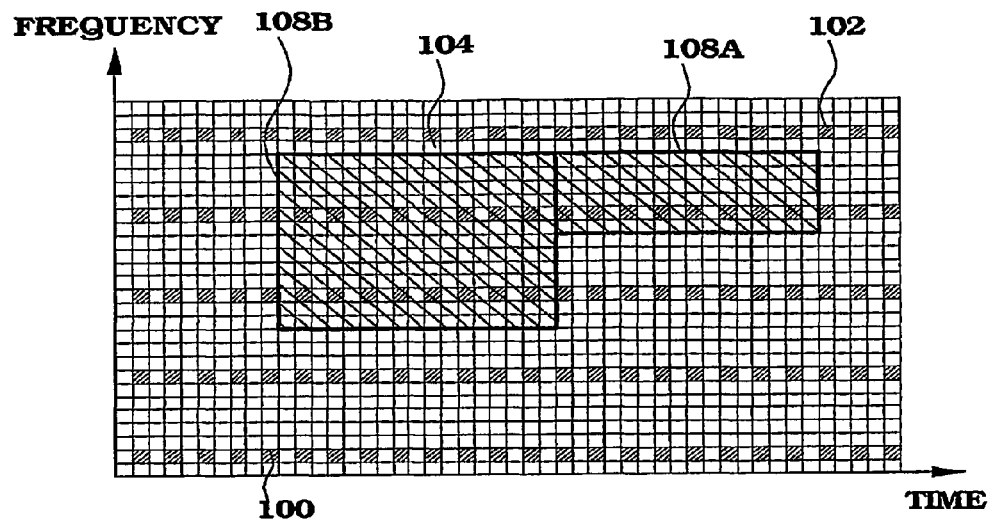

However, arranging the pilot structure as in FIG. 2B will change the situation. Here, there is a new update in time dimension every second time slot, which will supports the fast moving user equipment. Despite this increased density in time direction, the total amount of pilot data quantities is reduced somewhat. Now only one data quantity out of 12 comprises a pilot. The overhead has decreased from $\frac{1}{11}$ to $\frac{1}{12}$ (about 9%).

Figure 3A:
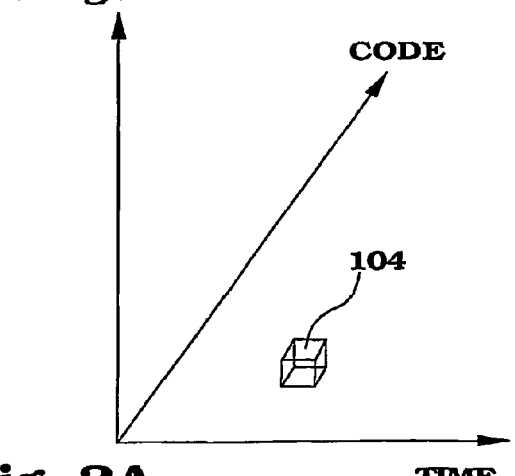
FIG. 3A illustrates a radio resource space having a code dimension.

However, user equipment 30A now encounters problems. This user equipment 30A moves slowly and is of limited use of the frequent updating in time. However, it has need for more closely located pilots in frequency dimension instead. The pilot structure of FIG. 2B becomes very unsuitable for user equipment 30A So far, only two dimensions, time and frequency, have been discussed. FIG. 3A illustrates a radio resource space in three dimensions, time, frequency and code. In such a system, each data quantity will instead correspond to a small cube 104. Generalisation can be performed to higher order spaces, comprising e.g. antenna or space dimensions. In general, any radio resource space in at least two dimensions, of which one is frequency, can be used with the technology disclosed herein.

Figure 3B:
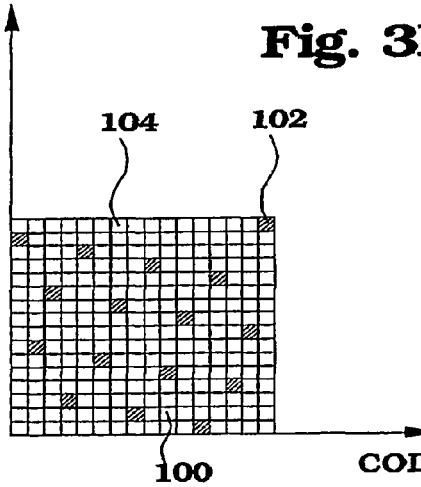
FIG. 3B is an illustration of a pilot structure in the frequency-code sub-space.

FIG. 3B illustrates a pilot pattern in a frequency-code space for a specified time. In this example 16 different codes are available and also 16 different frequencies. The illustrated pilot pattern leads to that the pilots are transmitted on all frequencies during the specified time duration, however, spread out in the code dimension. One code in each frequency is occupied by a pilot, whereas the remaining 15 codes are used for data transmission.

As mentioned briefly above, more generally the antenna or spatial dimensions could also be part of the resource space. One example is that different frequency bands are allocated to different beams of a multi-sector or fixed beam site. In this case, the spatial dimension is part of the description since different pilot patterns may be deployed for the different beams that overlap in the spatial domain. With the grouping of resources in terms of antenna sectors or beams the pilots allocated to different users can change dynamically when the user for example moves between sectors and the sectors have different frequency bands allocated to them. In such cases, antenna or spatial dimension can also be used as additional dimensions in a total resource space.

Figure 4:
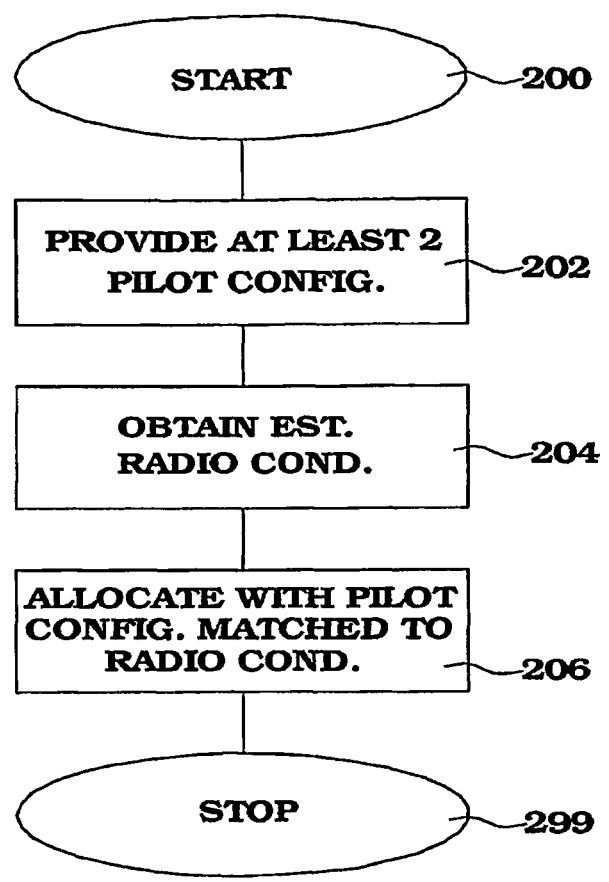
FIG. 4 is a flow diagram illustrating a method according to an example embodiment.

The flow diagram of FIG. 4 illustrates the main steps of an example embodiment of a method according to the technology disclosed herein. The procedure starts in step 200. In step 202, a number of pilot configurations are provided, which are believed to suit different radio conditions appearing in the cell in question. At least two such pilot configurations are available, i.e. they can be handled by both sides of the transmission connection. At least one of the pilot configurations comprises sub-carriers having both pilot resources and data resources, i.e. resources allocated for any data not previously known by the receiver, such as user data, control signals or broadcast information, in order to accommodate efficiency requests from e.g. slow-moving terminals. The transmitter manages the sending of pilots according to this configurations and the receiver is capable of performing channel estimation based on the at least two pilot configurations. In step 204, an estimation of the radio conditions at the receiver is obtained. This estimation can be provided in many different ways. The actual radio conditions can be measured and evaluated. Another possibility is to assume an estimate from knowledge about the characteristics in the cell and possibly based on e.g. location and/or speed of the receiver relative the transmitter.

In step 206, a user is allocated resources in resource space, which have a pilot configuration that is matched to the estimated radio conditions. This matching can be performed in different manners, described more in detail further below. The procedure stops in step 299. Anyone skilled in the art realises that step 202 preferably is performed once, and the provided pilot structures can then be used for any future allocation of users, or re-allocation of existing users.

Figure 5A:
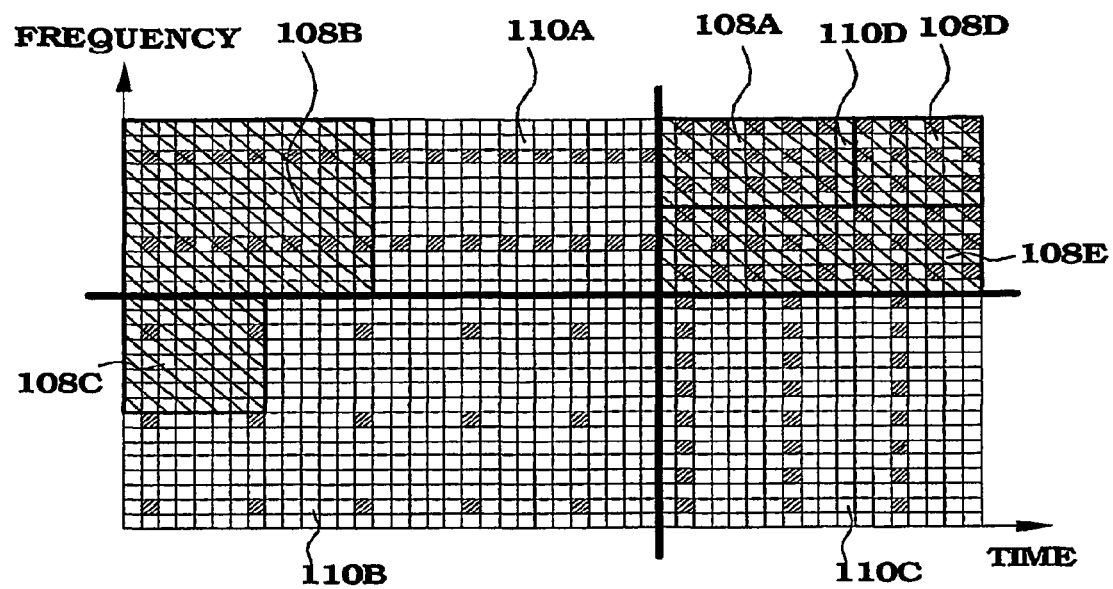
FIGS. 5A, 5B and 6 are diagrams illustrating pilot structures in time-frequency space, and the allocation of different users to subspaces according to example embodiments.

A few examples, using OFDM as an example system, will be used to visualise the effect of the technology disclosed herein. The basic setup in FIG. 5A is assumed as follows. During a certain time period and seen over all frequency resources, the available radio resources constitute a grid of basic resources that can be used for data, control signaling or pilot signals or other signals as discussed earlier. The resolution in frequency dimension is one OFDM carrier and in time it is one OFDM symbol. Pilot symbols are as above depicted with hatched boxes.

The transmitter side, in this example assumed to be the base station, determines a number of different pilot patterns and assigns these pilot patterns to different parts of the entire radio resource space. The pilot patterns may for example be periodically recurring with some period or pseudo-randomly designed. This means that different parts of the radio resource space have a denser or at least differing pilot pattern than other parts. Each pilot pattern is intended to accommodate users experiencing different channel characteristics.

This is illustrated in FIG. 5A. The entire radio resource space illustrated is divided into four rectangular parts, 110A-D. The resource space part 110A has a pilot pattern, having a dense occurrence in time dimension (every second OFDM symbol at certain carriers), but a more dispersed behaviour in the frequency dimension (only every sixth OFDM carrier). The resource space part 110B has a very diluted pilot pattern, having only one pilot in 36 resource units, evenly spread in time and frequency dimensions. The resource space part 110C is the opposite of part 110A, with a dense pilot pattern in frequency dimension, but sparse in time dimension. Finally, resource space part 110D has a very dense pilot structure in both dimensions, comprising a pilot symbol in every fourth resource unit.

According to one example embodiment of the technology disclosed herein, the users are now allocated to the different parts of the radio resource space dependent on their estimated radio conditions. In other words, whenever a certain user has certain demands, the user is assigned resources in the resource space where pilots with the appropriate density can be utilised for channel estimation. In the situation in FIG. 5A, there are pilot structures suitable for typically four combinations of Doppler and delay spread. In part 110A, the pilot structure is intended for a large Doppler and low delay spread. In part 110B, the pilot structure is intended for a low Doppler and low delay spread. In part 110C, the pilot structure is intended for a low Doppler and high delay spread. In part 110D, the pilot structure is intended for a high Doppler and high delay spread.

A first user, having radio conditions demanding a high density of pilots in both dimensions is allocated to the resource sub-space 108A within the part 110D. A second user, only having need for dense pilot in the time dimension is allocated resources in a resource sub-space 108B within the part 110A. A third user with very favourable radio conditions is allocated to a resource sub-space 108C in part 110B. Finally, two more users, having high demands on pilot density are given resources in two sub-spaces 108D and 108E, respectively in part 110D. One realises that each user has achieved a pilot pattern that is suited to its individual needs. It is beneficial, e.g. to assign resources for mobiles with certain fast varying channel or Doppler conditions in the dense parts of the pilot pattern and users with more slowly varying conditions in the less dense parts.

Note that the base station does not need to transmit all pilots at all times. Only pilots that in fact can be utilised by any user needs to be transmitted. If a pilot resource at time of transmission cannot be utilised by any data symbol that some user need to detect with the help of said pilot, then the pilot need not be transmitted. In such a way, the overall pilot pollution is reduced, and so is the average transmission power.

Figure 5B:
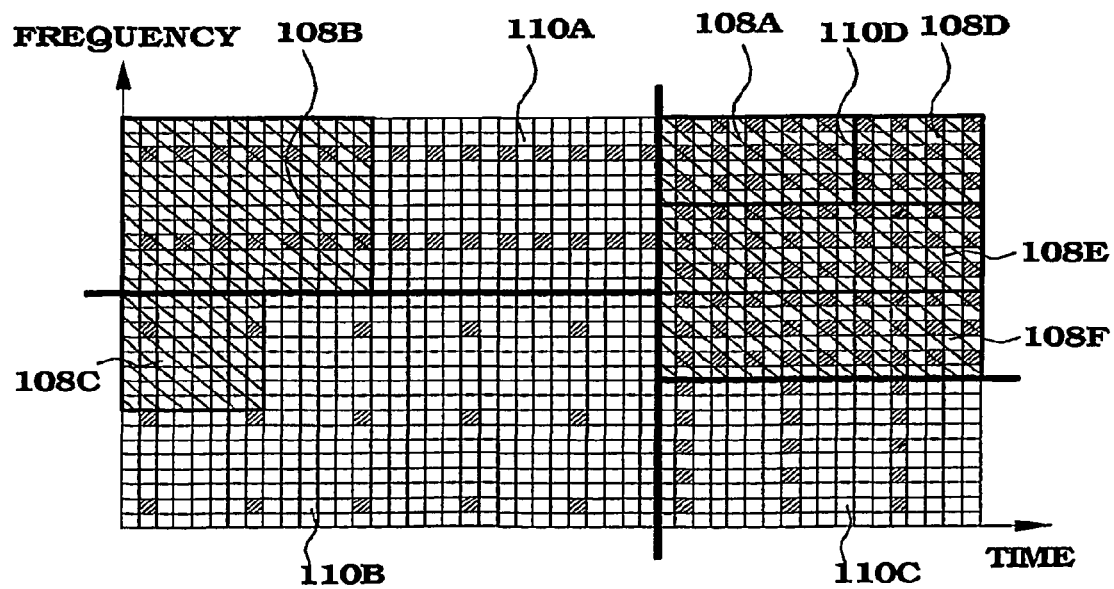

FIG. 5B illustrates a further example embodiment of the technology disclosed herein. Assume the same situation as was present in FIG. 5A. Three users are occupying all resources in the densest part 110D. And yet if another user with need for a very dense pilot configuration appears, the pre-defined pilot configuration plan of FIG. 5A becomes insufficient. However, the new user can be allocated to a free resource sub-space 108F, preferably in connection with the part 110D. This sub-space 108F had originally a pilot pattern according to part 110C, but when allocating the user, the pilot pattern is adjusted to match the demands put by the new user. In such a way, the original pre-determined division into different parts in the resource space can be adapted to the actual need. However, if a good initial configuration is used, most cases are covered and the frequency of adjustments is low.

Now, return to the situation of FIG. 5A. If the user having the allocation of sub-space 108E slows down, the estimated radio conditions change, and the need for pilots is reduced. The user can then be reallocated to another sub-space of the resource space, having a more suitable pilot configuration for the new estimated radio conditions, e.g. to part 110C. An alternative is to keep the allocated sub-space but instead change the pilot pattern to a more suitable one for the new conditions.

Figure 6:
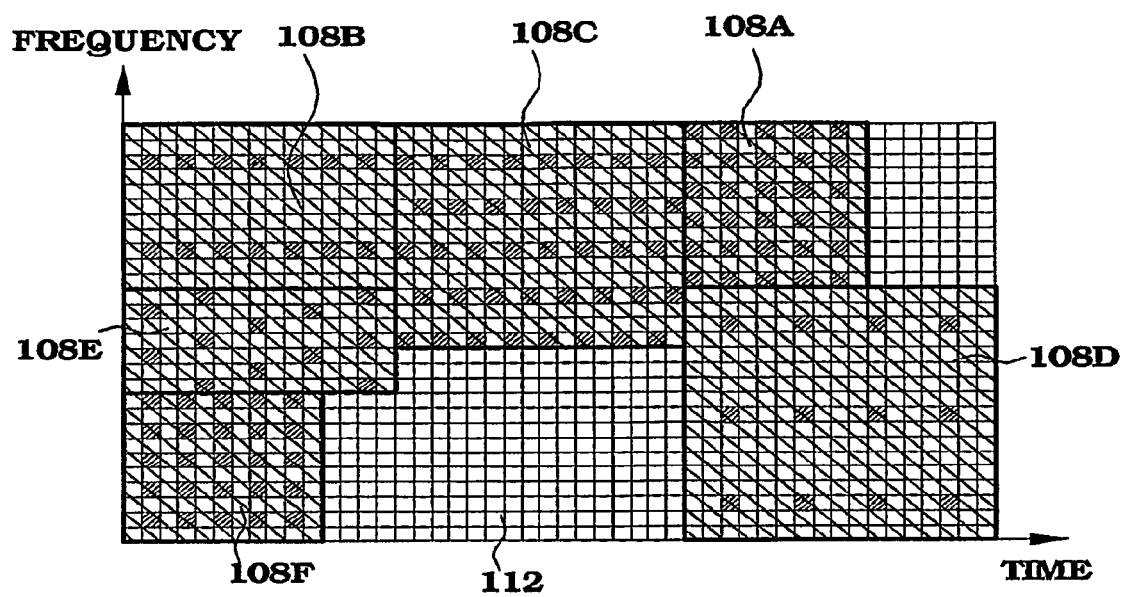

The ideas of adjusting or adapting the pilot configuration when needed can also be brought to the extreme end, where no pilot pattern at all is pre-configured for the different parts of the resource space. Instead, there is always an adjustment of pilot pattern for all users. This is schematically illustrated in FIG. 6. Here, a first user was assigned a sub-space 108A, without associated pre-defined pilot pattern. The pilot pattern was then adjusted according to the actual needs as concluded from the estimated radio conditions. In this case a dense pattern was selected. A second user was allocated to sub-space 108B and subsequently, a suitable pilot pattern was selected for this sub-space. In such a way, all the sub-spaces 108A-F were associated with pilot configurations suitable for each individual need. Sub-spaces not allocated to any user do not comprise any pilots in such an approach. A user with certain estimated properties is thus allocated to use certain resources and the pilot pattern is designed accordingly. The result is the same as the previous embodiments, pilot patterns and user characteristics are matched.

Figure 7A:
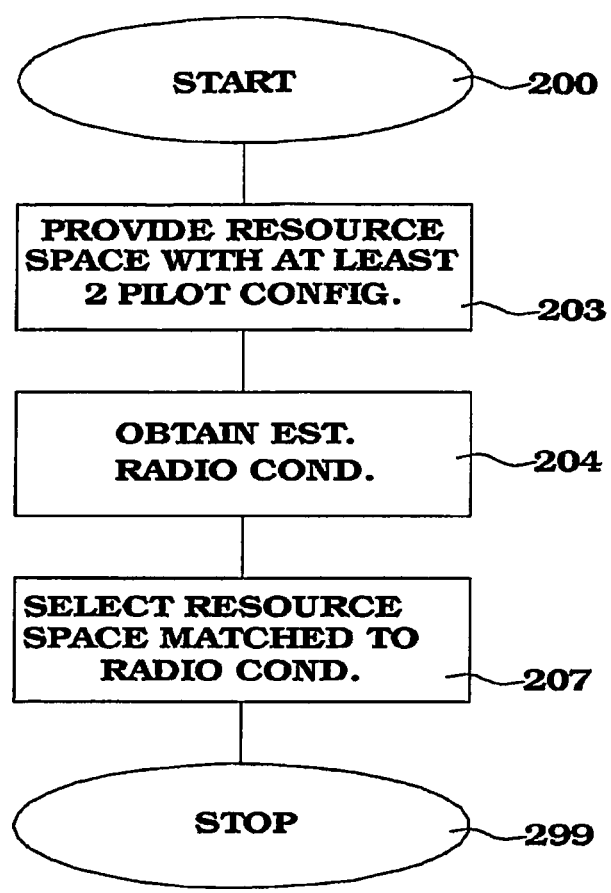
FIGS. 7A and 7B are flow diagrams illustrating other example method embodiments.

The above embodiments can also be expressed in flow diagrams. In FIG. 7A, a flow diagram corresponding to the situation in FIG. 5A is illustrated. The resource space is in step 203 provided with at least two different pre-determined pilot configurations at different parts of the resource space. Step 204 is unchanged compared to FIG. 4. In step 207, the matching of the radio conditions and pilot structures is performed by selecting a suitable resource space.

Figure 7B:
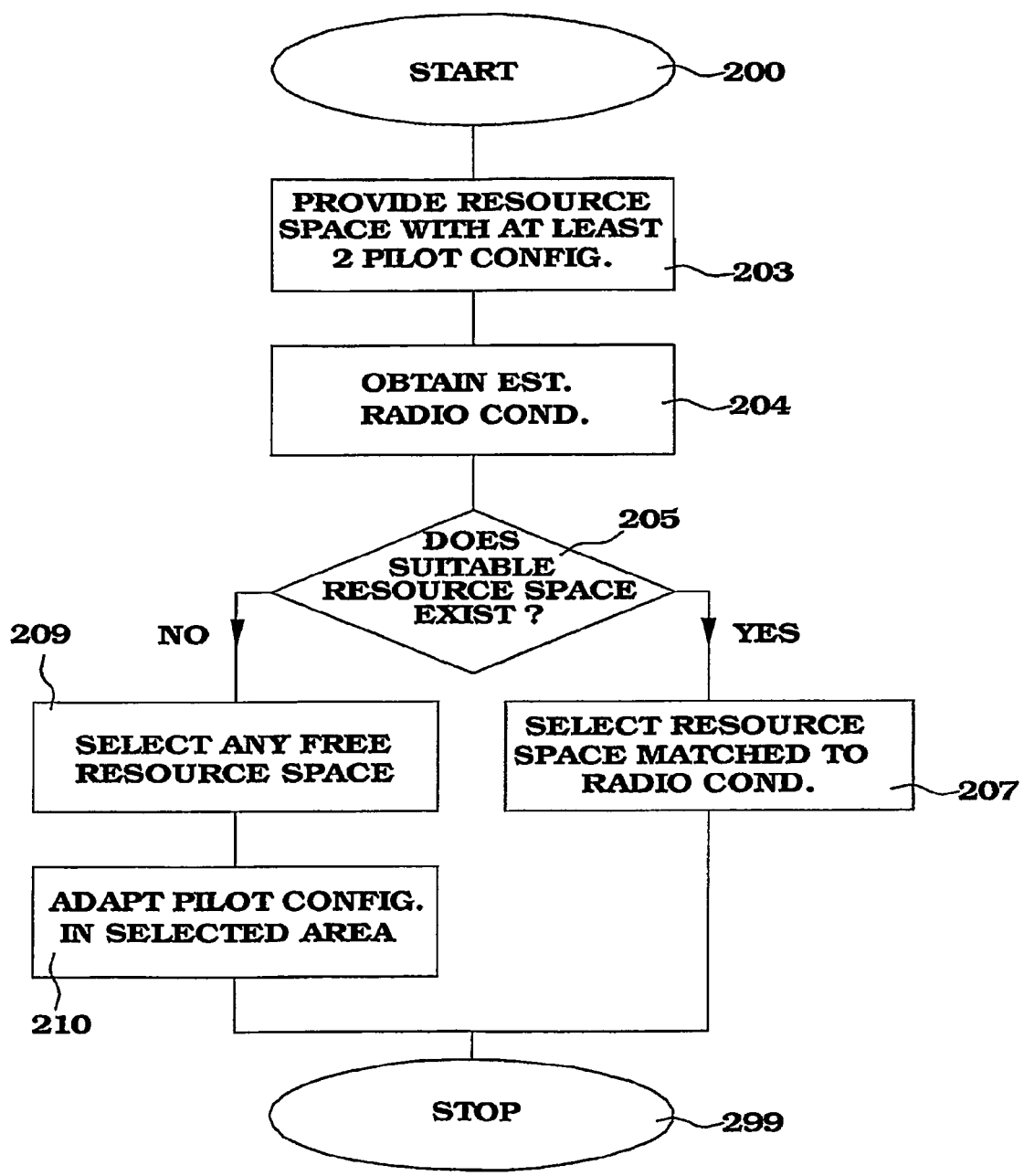

The situation in FIG. 5B is illustrated by the flow diagram of FIG. 7B. Also here, pre-defined pilot configurations are associated with different parts of the resource space in step 203. In step 205, it is determined whether there is any available resources in parts that are suitable for the particular estimated radio conditions for the user to be allocated. If there are resources with suitable pilot structures available, the procedure continues to step 207, as in FIG. 7A. If no resource space with appropriate pilot structure is available, any free resource space is allocated in step 209, however, preferably in the vicinity of the part having a suitable pilot pattern. In step 210, the pilot configuration is adapted within the selected resource sub-space to match the estimated radio conditions.

Figure 8:
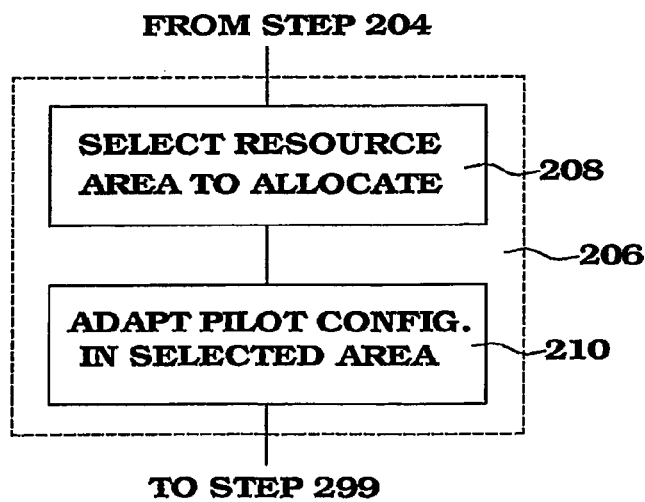
FIG. 8 is a flow diagram illustrating a part of a further example method embodiment.

The embodiment illustrated in FIG. 6 can similarly be illustrated by the part flow diagram of FIG. 8. Here, the step 206 in FIG. 4 is described in more detail. In step 208, an area is selected as a resource sub-space for the user. In step 210, the pilot configuration in the selected area is adapted to the need connected to the estimated radio conditions of the user. Note the similarities between FIG. 7B and FIG. 8.

The technology disclosed herein can be implemented for wireless communication between any nodes in a communications system. Such nodes can be e.g. user equipment, mobile station, base station, access point or relay. In the examples below, the most straightforward situation with communication between a base station and a user equipment will be discussed as an example. The scope of the claims should, however, not be affected by this example.

Figure 9A:
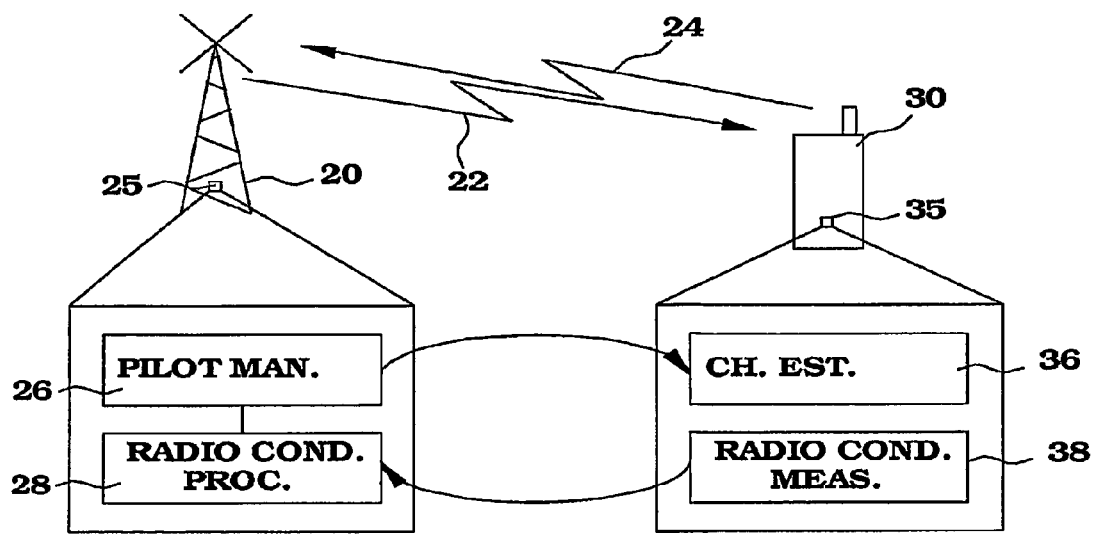
FIGS. 9A to 9C are block diagrams of downlink radio management devices of network nodes according to example embodiments.

Multi-carrier communication is typically most applied in downlink connections. In FIG. 9A, a wireless communications system according to an embodiment of the present invention is illustrated. A base station 20 communicates with a mobile terminal 30 via an uplink 24 and a downlink 22 connection. In the downlink communication, the ideas of the technology disclosed herein are implemented. The base station 20 comprises a downlink control unit 25, which is enlarged in the lower part of FIG. 9A. The downlink control unit 25 is responsible for allocating resources for communication on the downlink 22 between the base station 20 and the mobile terminal 30 and comprises in turn a pilot manager 26 and a radio condition processor 28. Similarly, the mobile terminal or user equipment 30 also comprises a downlink control unit 35, also enlarged in the lower part of FIG. 9A. The downlink control unit 35 comprises a channel estimator 36 and a measurement unit 38 for radio conditions.

The radio conditions measurement unit 38 measures the actual radio conditions at the user equipment 30. Such measurements can comprise e.g. Doppler shift and signal strength as well as power delay profile, channel impulse response, time and frequency selectivity measurements and interference levels. The results of the measurements are transferred to the radio conditions processor 28 of the base station 20, preferably by the uplink communication link 24. The radio conditions processor 28 evaluates the measured conditions and translates it to estimated radio conditions for the user equipment 30. In other words, the radio conditions processor 28 obtains data associated with estimated radio conditions for the user equipment 30. In a basic version, the estimated radio conditions could e.g. comprise two flags, one indicating low or high Doppler shift and one indicating small or large delay spread. When having a radio resource space in frequency and time dimensions, quantities associated with coherence bandwidth and coherence time, respectively, are of interest. The estimated radio conditions are forwarded to the pilot manager 26, which performs the actual selection and/or adjustment of resource sub-spaces. The pilot manager 26 thus provides access to the use of the different pilot configurations. When pre-defined pilot patterns are used, the pilot manager selects in which part of the multi-carrier space the allocated resource sub-space will be placed. Without pre-defined patterns in different parts of the multi-carrier space, the pilot manager 26 comprises functionalities for selecting a multi-carrier sub-space for allocation and functionalities to adapt the pilot pattern of that selected sub-space according to the estimated radio conditions. When the pilot manager has decided what pilot pattern to apply, the user equipment 30 has to be informed about the selection, in order to be able to perform the right channel estimation upon reception of the data. The pilot manager 26 thus comprises means for transferring suitable data to the channel estimator 36.

Figure 9B:
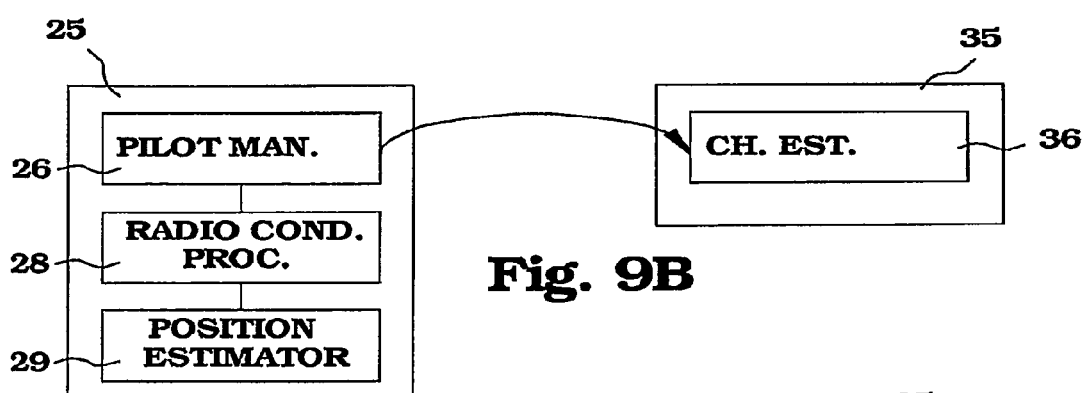

In FIG. 9B, another embodiment is illustrated, where the base station 20 has the entire responsibility for the selection of pilot structure. The downlink control unit 25 here also comprises a position estimator 29. The position estimator 29 provides an estimation of the position of the user equipment 30 and preferably also the velocity. This can be performed in any manner, e.g. according to prior art methods, and is not further discussed here. The position is forwarded to the radio condition processor 28. The radio condition processor 28 has access to knowledge about the different environments within the cell. A cell could e.g. cover a first area having generally slowly moving user equipments, and a second area, were the average speed is considerably higher. The position estimation could reveal the location of the user equipment, i.e. if it is situated in the high- or low-speed area. From such information, the radio condition processor 28 can conclude what radio conditions that should be assumed for the user equipment. Such estimation then forms the base on which the pilot pattern is selected.

Figure 9C:
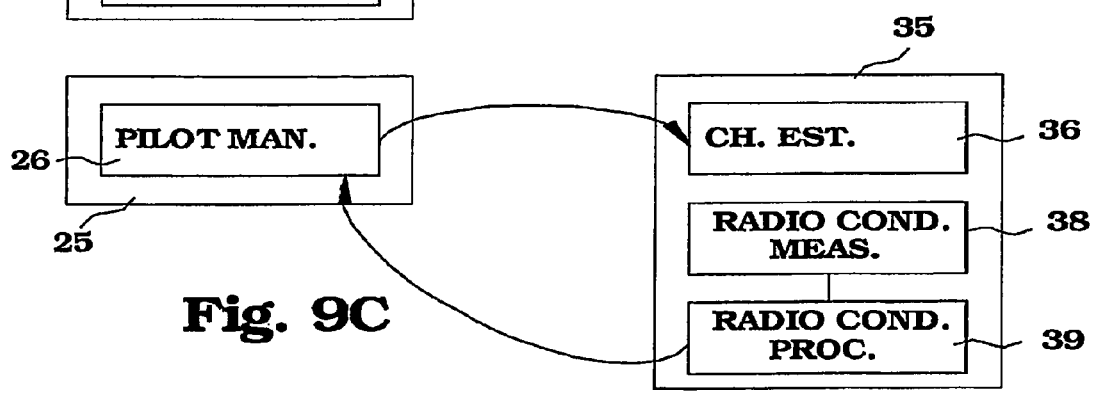

In FIG. 9C, yet another embodiment is illustrated. In this embodiment, the user equipment 30 makes more efforts in the procedure to find suitable pilot structures. The downlink control unit 35 here additionally comprises a radio conditions processor 39. This means that both the measurements and the evaluation of the measurements are performed in the user equipment 30. The estimated radio conditions are reported to the base station 20, e.g. in the form of data representing coherence bandwidth and coherence time, respectively. Alternatively, the radio conditions processor 39 can also select an appropriate pilot pattern and transmit a request to use such a pattern to the base station 20. The base station 20 can in such a case either follow the recommendation or overrule it and make an own decision.

Figure 10:
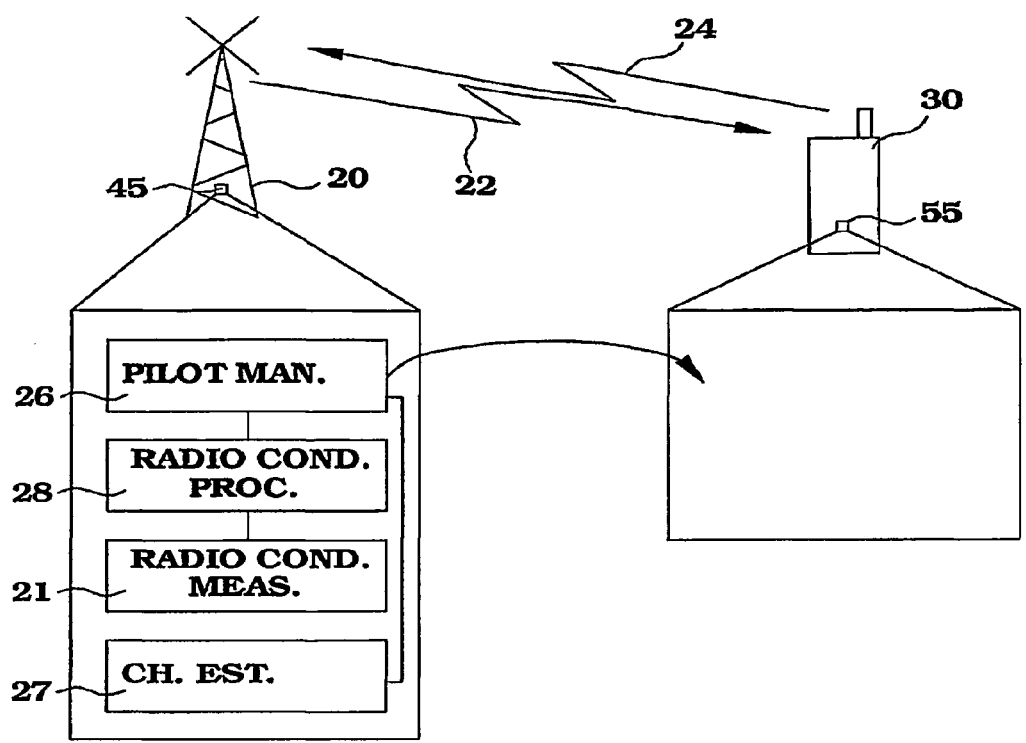
FIG. 10 is a block diagram of uplink radio management devices of network nodes according to example embodiments.

FIG. 10 illustrates one possible configuration for uplink communication. The base station 20 comprises an uplink control unit 45, in turn comprising a radio conditions measurement unit 21, a radio conditions processor 28 and a pilot manager 26. The operations of the units are similar to the ones in the downlink case, but adapted for uplink communication instead, i.e. it is the radio conditions of the received signals from the user equipment 30 that are of importance. The pilot manager 26 decides which pilot pattern that is appropriate to apply, and transmits a request to an uplink control unit 55 in the user equipment 30. In a basic version, the uplink control unit 55 simply applies the proposed pilot pattern on its uplink traffic. The uplink control unit 35 of the base station 20 also comprises a channel estimator 27 in order to be able to detect the data sent on the uplink. This channel estimator 27 is also informed about the pilot structure to use.

Figure 11:
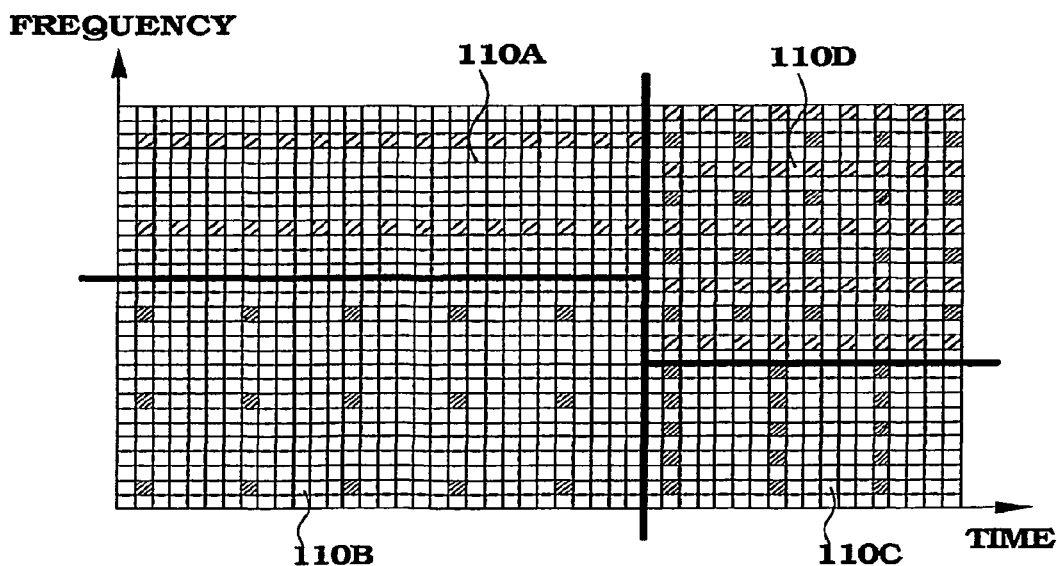
FIG. 11 is a diagram illustrating pilot structures in time-frequency space having different intensities, and the allocation of different users to subspaces according to an example embodiment.

FIG. 11 illustrates yet another example embodiment in which one makes use of the possibilities to vary the intensity to reduce pilot pollution. In parts 110A and 110D, all or some of the pilot data is marked to be transmitted with a lower (or zero) intensity. If a user equipment using the pilot signals is close to the base station, the transmission power does not have to be equally high to obtain a reasonable channel estimation compared with user equipments situated further away from the base station in such a way, it is also possible to vary the pilot intensity throughout the resource space. Such intensity configurations can as above be performed either in advance or as adjustment procedures.

The pilot symbols can also be transmitted with different power for different classes of users and depending on path loss. The power levels can either be dynamically varying between zero and a given number P.sub.max or be defined in advance. Note that a power level equal to zero is equivalent to no pilots for this slot, enabling the use of this slot for other purposes, such as data. If the power is dynamically varying, the power levels have to be signaled to the receiver for appropriate treatment.

When there are several possible pilot patterns to use in a system, the receiver has to be informed about which one is actually used. If a numbered set of pre-determined pilot patterns are used, the identification number of the pilot pattern is sufficient. However, more elaborate systems can use different pilot patterns for different cells and the numbering of patterns can be difficult to manage. In such a case, a solution is to transfer a complete description of the pilot pattern to be used. For regular pilot patterns, the amount of data that is needed to uniquely define the patterns is quite limited.

Figure 12:
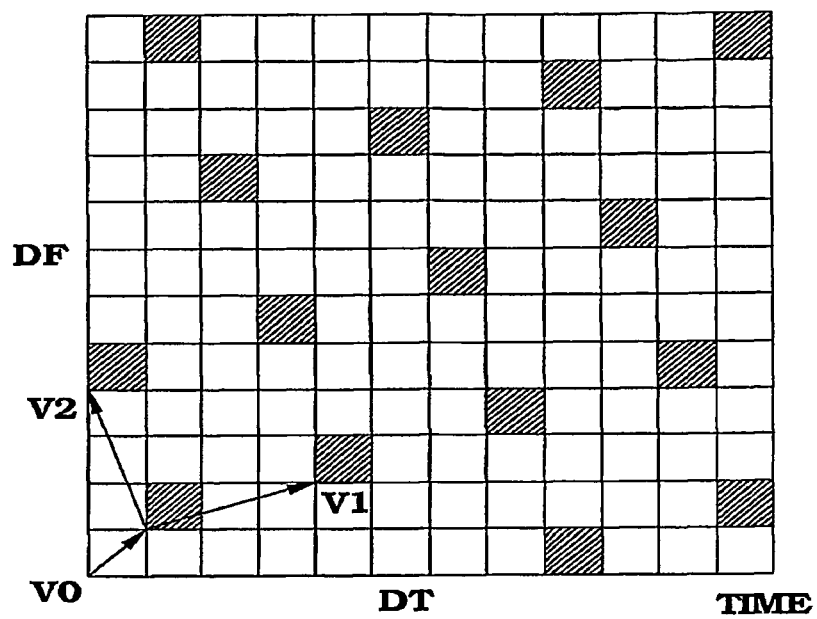
FIGS. 12 and 13 are diagrams illustrating limited data descriptions of regular pilot structure.

In FIG. 12, a pilot pattern is illustrated within a resource sub-space in frequency and time dimensions. The resource sub-space is reported anyway, and is typically defined by frequency and time "coordinates" and the number of frequency DF and time DT slots that are comprised in the sub-space. The pilot pattern is then easily characterised by only three vectors in the (two-dimensional) resource space. A first vector V0 defines the "distance" in frequency and time, respectively, between a well-defined position in the sub-space, e.g. the lower left corner as illustrated in the picture, and any pilot data within the pattern. A second vector V1 defines a "relative distance" between the two closest pilots in the pattern. A third vector V2 defines a "relative distance" between the second closest pilots, that is not aligned with the first vector V1. By knowing only these vectors, the entire pilot pattern can easily be calculated.

Figure 13:
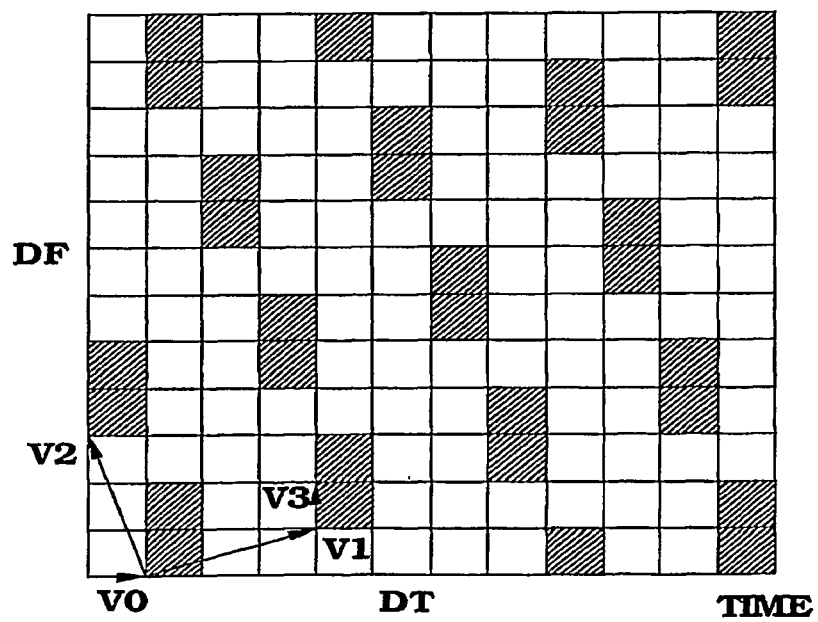

Also somewhat more complicated patterns can be fit into a similar model. In FIG. 13, a pattern having two neighbour pilots distributed in pairs over the resource space. In order to describe this pattern, only one extra vector is needed, the relative vector between the two pilots in each pair. Anyone skilled in the art realises that with a very limited number of data, rather complex pilot patterns can easily be defined.

It will be understood by those skilled in the art that various modifications and changes may be made to the present invention without departure from the scope thereof, which is defined by the appended claims.

What is claimed is:

1. A method for wireless communication in a multi-user, multi-carrier communications system, using a multi-carrier resource space of at least two dimensions, of which one is frequency, said multi-carrier communications system allowing a data stream to be separated into a series of parallel data streams, each of which is modulated and simultaneously transmitted with a different frequency, comprising the step of:

allocating a first resource sub-space of entire said multi-carrier resource space for communication between a first node and a second node;

said first resource sub-space comprising resources of more than one carrier;

obtaining data associated with estimated radio conditions for communication between the first node and the second node;

allocating a second resource sub-space of entire said multi-carrier resource space for communication between the first node and a third node;

said second resource sub-space comprising resources of more than one carrier, obtaining data associated with estimated radio conditions for communication between the first node and the third node; and providing access to the use of at least two pilot resource configurations, intended for different estimated node radio conditions, whereby the first resource sub-space is associated a pilot resource configuration, being in agreement with pilot need for the estimated radio conditions for the second node and the second resource sub-space is associated a pilot resource configuration, being in agreement with pilot need for the estimated radio conditions for the third node; and whereby at least one of the first resource sub-space and the second resource sub-space comprises a carrier having both pilot resources and data resources within said first resource sub-space or said second resource subspace, respectively.

2. The method according to claim 1, wherein the entire multi-carrier resource space being divided into parts having different pilot resource configurations;

whereby the steps of allocating comprises the steps of selecting the first resource sub-space and the second resource sub-space in respective parts having a pilot resource configuration suitable for the estimated radio conditions for the second node and the third node, respectively.

3. The method according to claim 2, comprising the further steps of:

selecting, if no resource space part having a pilot resource configuration suitable for the estimated radio conditions for the second node or the third node, respectively, is available, an arbitrary first multi-carrier resource sub-space; and adapting the pilot resource configuration within the first multi-carrier resource sub-space to suit the estimated radio conditions for the second node or the third node, respectively.

4. The method according to claim 1, further comprising the steps of:

selecting the first multi-carrier resource sub-space;

selecting the second multi-carrier resource sub-space; and adapting the pilot resource configuration within the first and second multi-carrier resource sub-space to suit the estimated radio conditions for the second node and the third node, respectively, after the step of selecting.

5. The method according to claim 1, wherein the multi-carrier resource space has a time dimension.

6. The method according to claim 1, wherein the multi-carrier resource space has a code dimension.

7. The method according to claim 1, wherein the multi-carrier resource space has a spatial dimension.

8. The method according to claim 1, wherein the steps of obtaining in turn comprises the steps of estimating a set of estimated radio conditions.

9. The method according to claim 8, wherein the set of estimated radio conditions comprises at least one of Doppler conditions and coherence time conditions.

10. The method according to claim 8, wherein the set of estimated radio conditions comprises at least one of delay spread conditions and coherence bandwidth conditions.

11. The method according to claim 8, wherein the steps of estimating are based on position and/or velocity information concerning the second node and the third node, respectively.

12. The method according to claim 1, wherein the steps of obtaining comprises the steps of receiving instructions and/or suggestions about preferred pilot resource configuration.

13. The method according to claim 1, wherein the first node is selected from the group of:
user equipment;
mobile station;
base station;
access point; and
relay.

14. The method according to claim 1, wherein at least one of the second node and the third node is selected from the group of:
user equipment;
mobile station;
base station;
access point; and
relay.

15. The method according to claim 1, wherein resources of the first and second resource sub-spaces are allocated for downlink communication.

16. The method according to claim 15, wherein the steps of obtaining data associated with estimated radio conditions for the second node and the third node is performed in a base station or access point.

17. The method according to claim 16, further comprising the steps of transferring data characterising the first pilot resource configuration from the base station or access point to the second node and transferring data characterising the second pilot resource configuration from the base station or access point to the third node.

18. The method according to claim 1, wherein resources of the first resource sub-space and the second resource sub-space are allocated for uplink communication.

19. The method according to claim 18, wherein the steps of obtaining data associated with estimated radio conditions for the second node and for the third node are performed in a base station or access point, followed by the steps of transferring the data associated with estimated radio conditions for the second node to the second node and transferring the data associated with estimated radio conditions for the third node to the third node.

20. The method according to claim 18, wherein the step of obtaining data associated with estimated radio conditions for the second node is performed in the second node and the step of obtaining data associated with estimated radio conditions for the third node is performed in the third node.

21. The method according to claim 20, further comprising the steps of transferring data characterising the first pilot resource configuration from the second node to the first node and transferring data characterising the second pilot resource configuration from the third node to the first node.

22. The method according to claim 1, further comprising the step of refraining from transmitting pilots in areas of the entire multi-carrier resource space not being allocated.

23. The method according to claim 1, wherein the wireless communication utilises OFDM.

24. The method according to claim 1, wherein the available at least two pilot resource configurations comprises different distribution patterns of pilot symbols in the multi-carrier resource space.

25. The method according to claim 24, wherein the available at least two pilot resource configurations further comprises transmission of pilot symbols with differing intensity.

26. A first node of a multi-user, multi-carrier wireless communications system using a multi-carrier resource space of least two dimensions, of which one is frequency, said first node being arranged for handling a data stream separated into a series of parallel data streams, each of which being modulated and simultaneously transmitted with a different frequency, the first node comprising:
  a transceiver operable to receive the data stream; and
  at least one processor coupled to the transceiver, the at least one processor operable to:
    allocate a first resource sub-space of entire said multi-carrier resource space for communication between the first node and a second node, said first resource sub-space comprising resources of more than one carrier;
    obtain data associated with estimated radio conditions for communication between the first node and the second node;
    allocate a second resource sub-space of entire said multi-carrier resource space for communication between the first node and a third node, said second resource sub-space comprising resources of more than one carrier;
    obtain data associated with estimated radio conditions for communication between the first node and the third node; and
    provide access to the use of at least two pilot resource configurations, intended for different estimated node radio conditions,
  whereby the first resource sub-space comprises a pilot resource configuration, being in agreement with pilot need for the estimated radio conditions for the second node and the second resource sub-space comprises a pilot resource configuration, being in agreement with pilot need for the estimated radio conditions for the third node, and
  whereby at least one of the first resource sub-space and the second resource sub-space comprises a carrier having both pilot resources and data resources within said first resource sub-space or said second resource subspace, respectively.

27. The first node according to claim 26, wherein the entire multi-carrier resource space is divided into parts having different pilot resource configurations;
  whereby the at least one processor is operable to select the first resource sub-space in a part having a pilot resource configuration suitable for the estimated radio conditions for the second node and for selecting the second resource sub-space in a part having a pilot resource configuration suitable for the estimated radio conditions for the third node.

28. The first node according to claim 26, wherein the at least one processor is further operable to:
  select the first multi-carrier resource sub-space;
  select the second multi-carrier resource sub-space; and
  adapt the pilot resource configuration within the first multi-carrier resource sub-space to suit the estimated radio conditions for the second node and for adapting the pilot resource configuration within the second multi-carrier resource sub-space to suit the estimated radio conditions for the third node.

29. The first node according to claim 26, wherein the at least one processor is further operable to transfer data characterising the first pilot resource configuration from the first node to the second node and for transferring data characterising the second pilot resource configuration from the first node to the third node.

30. The first node according to claim 26, wherein the receiver is further operable to receive instructions or suggestions about preferred pilot resource configuration from the second node and the third node.

31. The first node according to claim 26, being arranged for OFDM.

32. The first node according to claim 26, being a node selected from the group of:
  user equipment;
  mobile station;
  base station;
  access point; and
  relay.

33. The first node according to claim 26, wherein the second node is selected from the group of:
  user equipment;
  mobile station;
  base station;
  access point; and
  relay.

34. A user equipment operable to handle connection to a multi-user, multi-carrier wireless communications system using a multi-carrier resource space of least two dimensions, of which one is frequency, said user equipment being further arranged for handling a data stream to be separated into a series of parallel data streams, each of which is modulated and simultaneously transmitted with a different frequency, the user equipment comprising:
  a receiver operable to:
    use a first resource sub-space of entire said multi-carrier resource space for communicating with a node, the first resource sub-space comprising resources of more than one carrier; and
    receive data characterizing a first pilot resource configuration out of a set of at least two different pilot resource configurations from the node; and
  a processor in communication with the receiver, the processor operable to perform channel estimation based on the received data characterising the first pilot resource configuration;
  wherein the first pilot resource configuration is in agreement with pilot need for estimated radio conditions for the user equipment; and
  wherein the first resource sub-space comprises a carrier having both pilot resources and data resources within said first resource sub-space.

35. A multi-user, multi-carrier wireless communications system using a multi-carrier resource space of least two dimensions, of which one is frequency, said wireless communications system being arranged for handling a data stream separated into a series of parallel data streams, each of which being modulated and simultaneously transmitted with a different frequency, the multi-user, multi-carrier wireless communications system comprising:

a first node; and a second node in communication with first node, and wherein at least one of the first node and the second node comprises:

at least one processor operable to:

allocate a first resource sub-space of entire said multi-carrier resource space for communication between the first node and a second node, wherein the first resource sub-space comprises resources of more than one carrier; and allocate a second resource sub-space of entire said multi-carrier resource space for communication between the first node and a third node, wherein said second resource sub-space comprises resources of more than one carrier;

obtain data associated with estimated radio conditions for communication between the first node and the second node;

obtain data associated with estimated radio conditions for communication between the first node and the third node; and provide access to the use of at least two pilot resource configurations, intended for different estimated node radio conditions, wherein the first resource sub-space comprises a pilot resource configuration, being in agreement with pilot need for the estimated radio conditions for the second node and the second resource sub-space comprises a pilot resource configuration, being in agreement with pilot need for the estimated radio conditions for the third node, and wherein at least one of the first resource sub-space and the second resource sub-space comprises a carrier having both pilot resources and data resources within said first resource sub-space or said second resource sub-space, respectively.

* * * * *